United States Patent
Hudyma et al.

(10) Patent No.: US 10,330,900 B1
(45) Date of Patent: Jun. 25, 2019

(54) PROJECTION ZOOM LENS AND CAMERA

(71) Applicant: Navitar Industries, LLC, Rochester, NY (US)

(72) Inventors: Russell Hudyma, San Ramon, CA (US); Michael Thomas, Woburn, MA (US); Arash Ghorbani, Auburn, CA (US)

(73) Assignee: Navitar Industries, LLC, Rochester, NY (US)

( * ) Notice: Subject to any disclaimer, the term of this patent is extended or adjusted under 35 U.S.C. 154(b) by 7 days.

(21) Appl. No.: 15/830,147

(22) Filed: Dec. 4, 2017

Related U.S. Application Data

(63) Continuation of application No. 15/095,161, filed on Apr. 11, 2016, now Pat. No. 9,835,835.

(60) Provisional application No. 62/146,130, filed on Apr. 10, 2015.

(51) Int. Cl.
| | |
|---|---|
| *G02B 15/16* | (2006.01) |
| *G02B 13/00* | (2006.01) |
| *G02B 27/00* | (2006.01) |
| *G02B 13/16* | (2006.01) |
| *G02B 15/167* | (2006.01) |

(52) U.S. Cl.
CPC ......... *G02B 15/16* (2013.01); *G02B 13/0095* (2013.01); *G02B 13/16* (2013.01); *G02B 15/167* (2013.01); *G02B 27/0025* (2013.01)

(58) Field of Classification Search
CPC ...... G02B 13/009; G02B 13/16; G02B 15/14; G02B 15/15; G02B 15/16; G02B 15/163; G02B 15/167; G02B 15/17; G02B 15/173; G02B 15/177; G02B 15/20

USPC .................................................. 359/676–690
See application file for complete search history.

(56) References Cited

U.S. PATENT DOCUMENTS

| | | | |
|---|---|---|---|
| 5,973,826 | A | 10/1999 | Chapman et al. |
| 6,033,079 | A | 3/2000 | Hudyma |
| 6,072,852 | A | 6/2000 | Hudyma |
| 6,147,818 | A | 11/2000 | Hale et al. |
| 6,262,836 | B1 | 1/2001 | Hudyma et al. |
| 6,183,095 | B1 | 2/2001 | Hudyma |
| 6,188,513 | B1 | 2/2001 | Hudyma |
| 6,226,346 | B1 | 5/2001 | Hudyma |
| 6,318,869 | B1 | 11/2001 | Hudyma |
| 6,426,506 | B1 | 7/2002 | Hudyma |
| 6,636,350 | B2 | 10/2003 | Shafer et al. |
| 6,864,861 | B2 | 3/2005 | Schehrer et al. |
| 6,906,866 | B2 | 6/2005 | Hudyma et al. |

(Continued)

OTHER PUBLICATIONS

Non-Final Rejection, dated May 26, 2017, for U.S. Appl. No. 15/095,161, filed Apr. 11, 2016.

(Continued)

*Primary Examiner* — Darryl J Collins
(74) *Attorney, Agent, or Firm* — SF Bay Area Patents, LLC; Andrew V. Smith

(57) ABSTRACT

A projection zoom lens assembly for a digital cinema projection system includes three optical groups. A first optical group includes one or more wide angle lenses for projecting digital cinema images. A second optical group includes a set of zoom optical groups each comprising two or more lenses, including a first independently movable zoom group, a second independently movable zoom group, and a third zoom group. A third optical group includes multiple lenses for receiving images for projection.

47 Claims, 2 Drawing Sheets

(56) References Cited

U.S. PATENT DOCUMENTS

| | | | |
|---|---|---|---|
| 6,927,901 B2 | 8/2005 | Mann et al. |
| 6,985,210 B2 | 1/2006 | Hudyma et al. |
| 7,009,140 B2 | 3/2006 | Partio et al. |
| 7,061,959 B2 | 6/2006 | Partio et al. |
| 7,085,075 B2 | 8/2006 | Mann et al. |
| 7,151,592 B2 | 12/2006 | Hudyma et al. |
| 7,190,527 B2 | 3/2007 | Rostalski et al. |
| 7,190,530 B2 | 3/2007 | Mann et al. |
| 7,199,922 B2 | 4/2007 | Ruggeri et al. |
| 7,218,445 B2 | 5/2007 | Shafer et al. |
| 7,237,915 B2 | 7/2007 | Hudyma |
| 7,355,568 B2 | 4/2008 | Homma |
| 7,375,798 B2 | 5/2008 | Hudyma et al. |
| 7,382,540 B2 | 6/2008 | Rostalski et al. |
| 7,450,301 B2 | 11/2008 | Mann et al. |
| 7,508,581 B2 | 3/2009 | Hudyma |
| 7,859,748 B2 | 12/2010 | Shafer et al. |
| RE42,118 E | 2/2011 | Hudyma et al. |
| 7,884,303 B2 | 2/2011 | Dartlo et al. |
| 8,362,391 B2 | 1/2013 | Dartlo et al. |
| 9,835,835 B1 | 12/2017 | Hudyma et al. |
| 2007/0263294 A1 | 11/2007 | Yamada |
| 2009/0067060 A1* | 3/2009 | Sudoh ............... G02B 9/62 359/683 |
| 2013/0229564 A1* | 9/2013 | Saori ............... G02B 15/173 348/340 |
| 2015/0277090 A1 | 10/2015 | Sugita |

OTHER PUBLICATIONS

Notice of Allowance, dated Oct. 19, 2017, for U.S. Appl. No. 15/095,161, filed Apr. 11, 2016.

\* cited by examiner

PROJECTION ZOOM LENS AND CAMERA

PRIORITY

This application is a Continuation of U.S. patent application Ser. No. 15/095,161, filed Apr. 11, 2016, now U.S. Pat. No. 9,835,835, which claims priority to U.S. provisional patent application No. 62/146,130, filed Apr. 10, 2015. Each of these priority applications is incorporated by reference.

BACKGROUND

For more than twenty years, DLP projection display systems have offered smooth (at 1080p resolution), jitter-free images with excellent geometry and grayscale linearity and usually excellent ANSI contrast. The light from the projected image is not inherently polarized. New LED and laser DLP display systems more or less eliminate the need for lamp replacement. DLP offers affordable 3D projection display from a single unit and can be used with both active and passive 3D solutions.

DLP systems are typically lighter weight than LCD and plasma televisions. Unlike their LCD and plasma counterparts, DLP screens do not rely on fluids as their projection medium and are therefore not limited in size by their inherent mirror mechanisms, making them ideal for increasingly larger high-definition theater and venue screens. DLP projectors can process up to 7 separate colors, giving them a wide color gamut.

However, rear projection DLP TVs are not as thin as LCD or plasma flat-panel displays (although approximately comparable in weight). Dithering noise may be noticeable, especially in dark image areas. Newer chip generations have less noise than older ones. Error-diffusion artifacts are sometimes caused by averaging a shade over different pixels, since one pixel often cannot render the shade exactly. Response time in video games may be affected by upscaling lag. While HDTVs typically have some lag when upscaling lower resolution input to their native resolution, DLPs are commonly reported to have longer delays. Newer consoles such as the Wii do not have this problem as long as they are connected with HD-capable cables.

DLP images that are displayed have to be viewed at a reduced viewing angle as compared to direct-view technologies such as CRT, plasma, and LCD. DLP systems may use more electricity, and generate more heat, than competing technologies. Some people may be able to observe a phenomenon in which the projected contents appear to be cycling through its colors for the duration of the presentation. This is most easily seen by using a camera's 'live view' mode on projected content.

It is desired to have a projection zoom lens assembly that offers enhanced high resolution projection of images with low distortion and low chromatic aberration.

BRIEF DESCRIPTION OF THE TABLES

Figure 1:
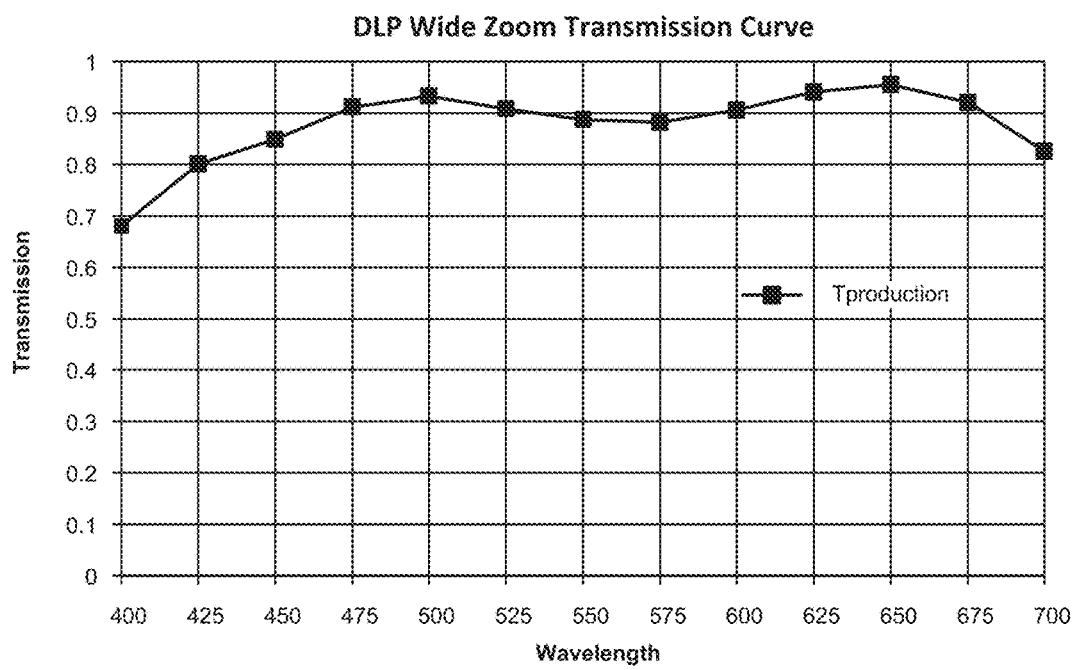
FIG. 1 shows a plot of transmission versus wavelength for an example projection lens assembly in accordance with certain embodiments.

Table 1 includes object specifications for an example projection zoom lens assembly in accordance with certain embodiments.

Table 2 includes imaging details for an example projection lens assembly in accordance with certain embodiments.

Table 3 includes projected resolution details for an example projection lens assembly in accordance with certain embodiments.

Table 4 includes illumination details for an example projection lens assembly in accordance with certain embodiments.

Table 5 includes operating details for an example projection lens assembly in accordance with certain embodiments.

Table 6 includes an optical prescription for an example projection lens assembly in accordance with certain embodiments.

Table 7 includes example specification data for a projection lens assembly in accordance with certain embodiments.

Table 8 includes example aperture data and edge definitions for a projection lens assembly in accordance with certain embodiments.

Table 9 lists refractive indices for certain glasses that may be used in certain lenses in an example projection lens assembly in accordance with certain embodiments.

Table 10 includes five example zoom positions of an example projection lens assembly in accordance with certain embodiments.

Table 11 includes zoom characteristics of the five zoom positions of Table 10 for an example projection lens assembly in accordance with certain embodiments.

Table 12 includes example imaging characteristics of a projection lens assembly in accordance with certain embodiments.

DETAILED DESCRIPTION OF THE EMBODIMENTS

A projection zoom lens assembly is provided for a digital cinema projection system. A first optical group includes one or more wide angle lenses for projecting digital cinema images. A second optical group includes a set of zoom optical groups each comprising two or more lenses, including a first movable zoom group, a second movable zoom group, and a fixed zoom group. A third optical group includes multiple lenses for receiving images for projection.

The first movable zoom group may be movable relative to each of the first and third optical groups and the fixed zoom group. The second movable zoom group may be movable relative to the first movable zoom group, the first and third optical groups, and the fixed zoom group.

The first optical group includes a first lens having a largest diameter among the lenses of the projection zoom lens assembly. The first optical group may include a second lens having a second largest diameter among the lenses of the projection zoom lens assembly. Lenses of the second and third optical groups may have approximately a same diameter smaller than those of the first and second lenses of the first optical group.

The second movable zoom group may include an aperture stop. The aperture stop may be disposed between a doublet and a singlet of the second movable zoom group.

The third optical group may include a doublet or a quasi-doublet or both. A quasi-doublet is referred to herein as a pair of closely-spaced lenses that are not in contact over their entire radius but may be in contact or approximately so at one or more radial locations. The third optical group may include a meniscus and a biconvex lens.

Each of the zoom optical groups may include a singlet spaced from a doublet or a quasi-doublet.

A first adjustable spacing may be defined between the first optical group and the first movable zoom group. A second adjustable spacing may be defined between the first movable zoom group and the second movable zoom group. A third adjustable spacing may be defined between the second movable zoom group and the fixed zoom group.

The projection zoom lens assembly may exhibit axial chromatic aberrations less than 20 microns.

The projection zoom lens assembly may exhibit lateral chromatic aberrations less than 0.75 pixels.

The projection zoom lens assembly may exhibit lateral chromatic aberrations less than 0.5 pixels.

The projection zoom lens assembly may exhibit distortion at 0.75 field of less than 2.5%.

The projection zoom lens assembly may exhibit distortion at 0.95 field of less than 2.0%.

The projection zoom lens assembly may exhibit a throw ratio range between 0.8-1.1.

The projection zoom lens assembly may exhibit a color transmission differential of less than 8%.

The projection zoom lens assembly may exhibit a total light transmission of greater than 90%.

The projection zoom lens assembly may exhibit a focus drift of less than 5 microns/20° C.

The projection zoom lens assembly may be configured to focus from infinity to 25 feet.

The projection zoom lens assembly may be configured such that a rotational torque of the projection zoom lens is less than 0.5 N-m.

A digital cinema projection system is also provided that includes a relay lens assembly and a projection zoom lens assembly as described above or below herein.

A zoom lens assembly in accordance with certain embodiments may project a relayed image of DLP panels onto a large format screen to create an immersion cinema experience. The zoom lenses may be matched so that in certain embodiments the images from multiple channels and/or multiple panels can be overlaid.

A DLP Cinema Projection Zoom Lens assembly is described with reference to accompanying drawings and tables for use in the Digital Cinema Market.

A projection system in accordance with certain embodiments may include the following two modules: (a) an optical relay component, e.g., a lens, such as a single 1× relay lens; and (b) an optical zoom component, e.g., including two wide zoom projection lenses. This specification describes examples of a zoom lens in accordance with certain embodiments in detail. The projection system may be used within a 1.38" diagonal enhanced 4K DLP imaging chip and may be used within 3D Digital Cinema applications. Both the relay and zoom have a sufficient large field to cover the 4K DLP panel with added offset. The throw ratio range of the projection zoom lens specified herein may in certain embodiments be in a range between 0.8-1.1.

Projection Lens Optical Design Type

The optical design type may include a dioptric projection zoom with multiple moving groups and a constant f/number thru zoom.

Object (Intermediate Image) Specifications

The object specifications for an example projection zoom in accordance with certain embodiments are listed below in Table 1.

TABLE 1

| Panel | Nominal | Units/Notes |
|---|---|---|
| Pixel pitch | 7.6 | Um |
| Resolution | 4096 × 2160 | Pixels |
| Pixel aspect ratio | 1:1 | width:height each pixel |
| Panel aspect ratio | 1.896:1 | width:height full panel |
| Intermediate image size | 35.2 | mm diagonal |

Imaging

The imaging details for an example projection zoom in accordance with certain embodiments are listed below in Table 2.

TABLE 2

Example Embodiment

| Characteristics | Nominal | Units/Notes |
|---|---|---|
| Design wavelengths (weights) | 460 (1), 546 (2), 620 (1) | Nm |
| Nominal throw distance | 20 | meters |
| Throw distance range | 15-45 | meters |
| Nominal screen width | 22 | meters (or 73 ft) |
| Throw ratio | 0.8-1.1 zoom | screen width/throw |
| EFL | | |
| Operating range | 24.9-31.9 | mm, zoom, imaging requirements best effort outside operating range |
| Total range with over-travel | 24.0-36.0 | |
| F-number | 2.5 | |
| Pupil apodization | uniform | |
| Field size | 45.25 | mm. Includes +/−50% vertical shift. Horizontal shift is 0% at maximum vertical offset. |
| BFL | Minimum 5 mm air | Equivalent to back working distance (BWD). |
| Exit pupil location (screen side) | ≤50 | mm, measured from vertex of lens surface nearest the screen, reverse ray trace |
| Focus adjustment | +/−3.0 | mm, externally accessible adjustment |
| Telecentricity | +/−1.0 | degree, max, full field, tlu-u zoom |
| Distortion, 0.75-field | <2.5% | Chief ray relative to paraxial ray position, full field, over operating zoom range. |

TABLE 2-continued

Example Embodiment

| Characteristics | Nominal | Units/Notes |
|---|---|---|
| Distortion, 0.95-field | <2.0% | Chief ray relative to paraxial ray position, full field, over operating zoom range. |
| Matched pair distortion difference | $\|D_{distortion}\| < 0.11\%$ | Better than 2 pixel overlap required in corners, after zoom, focus, and offset adjustments. Motion of internal compensation group is also allowed. |
| Lateral color R-G, 0.75-field | <0.50 | pixel, max |
| Lateral color R-G, 0.95-field | <0.50 | pixel, max |
| Lateral color B-G, 0.75-field | <0.75 | pixel, max |
| Lateral color B-G, 0.95-field | <0.75 | pixel, max |
| Lateral color B-R, 0.75-field | <0.75 | pixel, max |
| Lateral color B-R, 0.95-field | <0.75 | pixel, max |
| Axial color, R-G | $\|D_{R-G}\| < 20$ | um, relative to G, evaluated at 0.6 pupil for B = 460 nm, G = 546 nm, R = 620 nm, 20 m image distance |
| Axial color, B-G | $\|D_{B-G}\| < 20$ | um, relative to G, evaluated at 0.6 pupil for B = 460 nm, G = 546 nm, R = 620 nm, 20 m image distance |
| Individual R, G, B MTF Target 1 (Tangential/Sagittal) | >95% | 10 lp/mm, 0-0.9 field, <T&S> by design, at a single focal plane for R, G, B |
| Individual R, G, B MTF Target 2 (Tangential/Sagittal) | >84% | 30 lp/mm, 0-0.9 field, <T&S> by design, at a single focal plane for R, G, B |
| Individual R, G, B MTF Target 3 (Tangential/Sagittal) | >50% | 66 lp/mm, 0-0.9 field, <T&S> by design, at a single focal plane for R, G, B |
| Individual R, G, B MTF Target 4 (Tangential/Sagittal) | >20% | 100 lp/mm, 0-0.9 field, <T&S> by design, at a single focal plane for R, G, B |
| Image shift, vertical | +/−50% | screen height |
| Projected Resolution | Table 3 | Table 3 |
| Transmission | Table 4 | Table 4 |

Projected Resolution Details

Projected resolution details for an example projection zoom in accordance with certain embodiments are provided in Table 3.

TABLE 3

| Resolution Requirements | Nominal | Units/Notes |
|---|---|---|
| Axis | 150 lp/mm | Visual projection test at 12 m |
| 0.3 Field | 125 lp/mm | Visual projection test at 12 m |
| 0.6 Field | 100 lp/mm | Visual projection test at 12 m |
| 0.9 Field | 75 lp/mm | Visual projection test at 12 m 100 lp/mm best effort |

Illumination Details

The screen illumination details for an example projection zoom in accordance with certain embodiments are listed in Table 4.

TABLE 4

| Illumination Requirements | Nominal | Units/Notes |
|---|---|---|
| Relative illumination | >75% | 0.95 field |
| Total light transmission | >90% | average over 440-660 nm |
| Color transmission differential, R-G, B-G | <50% | B = 460 nm, G = 546 nm, R = 620 nm |
| Color transmission differential, B-R | <8% | B = 460 nm, G = 546 nm, R = 620 nm |

A transmission curve is provided in FIG. 1, including a plot of transmission versus wavelength for a projection zoom lens assembly in accordance with certain embodiments.

Operating Details

Operating details for an example projection zoom in accordance with certain embodiments are listed in Table 5.

TABLE 5

| Operating Requirements | Nominal | Units/Notes |
|---|---|---|
| ANSI contrast | >400:1 | reference only |
| Luminous flux range | 10,000-40,000 | lumens, reference, laser compatible |
| Environmental operating temp | 20 +15/−5 C. | reference |
| Focus drift | <5 | um/20 C., over environmental operating range, per thermal simulation |
| Boresight | <0.25 | deg, line of sight error to center of display relative to mechanical datums |
| Decenter | <0.50 | mm, optical axis relative to mechanical datums |

Mechanical Details

Figure 2:
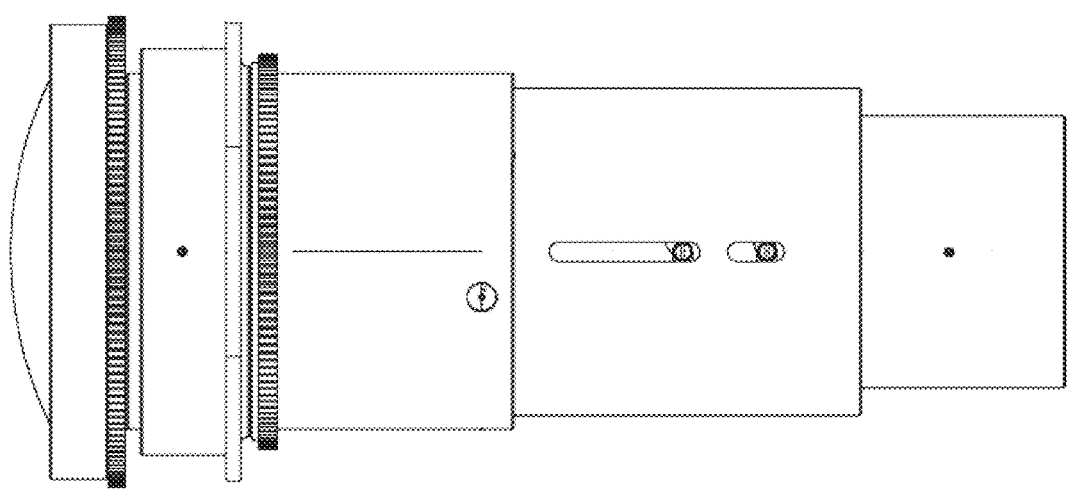
FIG. 2 schematically illustrates a side view of a projection lens assembly outline and mounting in accordance with certain embodiments.

FIG. 2 schematically illustrates outline and mounting details for an example projection zoom lens assembly including the location of the zoom and focus rings, relevant mechanical dimensions, and flange focal distance details. At infinite conjugates, the flange focal distance of the projection lens assembly may be factory set in certain embodiments at a distance of 151.50 mm±0.50 mm.

Optical Details

Figure 3A:
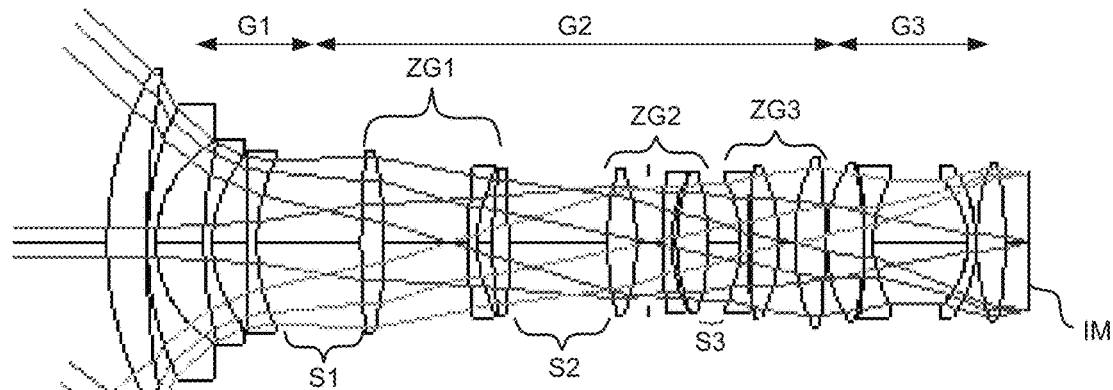
FIGS. 3A-3C schematically illustrate side views of optical elements of a projection zoom assembly for three relative positions of two movable zoom lens groups in accordance with certain embodiments.
Figure 3B:
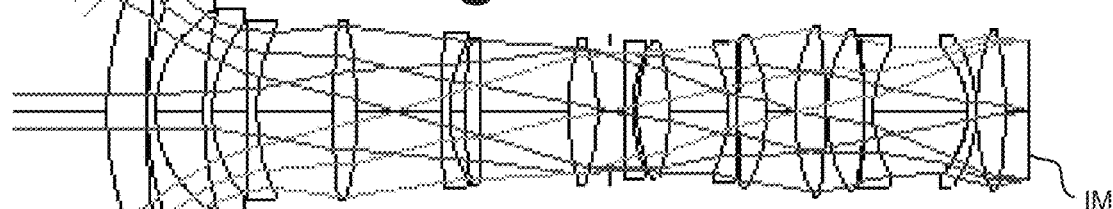
Figure 3C:
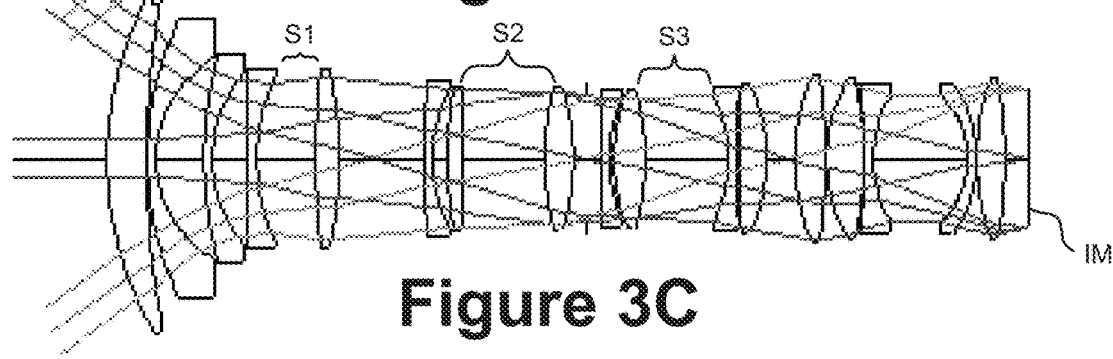

FIGS. 3A-3C schematically illustrate side views of optical elements within three optical groups G1, G2 and G3 from closest to furthest from the projection end of an example projection zoom assembly for three relative positions of two movable zoom lens groups ZG1 and ZG2 and a fixed zoom lens group ZG3 in accordance with certain embodiments. Table 6 includes an optical prescription for the example projection zoom assembly of FIGS. 3A-3C, including the radius of curvature of each optical surface of the example projection zoom lens assembly, the thickness of each lens, the spacings between lenses, and the glass type for each lens. Each of the projection zoom assemblies of FIGS. 3A-3C include from closest to furthest from the projection end, the first optical group G1 that includes four lenses in this example embodiment, a second optical group G2 that includes nine lenses in this example embodiment, and a third optical group G3 that includes four lenses in this example embodiment. Each lens group G1, G2 and G3 may include more or fewer than these respective numbers of lenses.

The first optical group G1 includes, from closest to further from the projection end, a first, second and third lenses each having a larger diameter than any lens to its right in the side views of FIGS. 3A-3C. Each of these first three lenses is convexo-planar or convexo-quasi-planar or convexo-concave. A fourth lens of the first optical group has a diameter that is approximately the same as the diameters of other lenses of the optical assembly within the second and third lens groups G2, G3. The first optical group is configured to project digital cinema images at a wide field, e.g., 90 degrees or more.

The second optical group G2 includes, from closest to furthest from the projection end, a first zoom group ZG1, a second zoom group ZG2, and a third zoom group ZG3. In this example, the first zoom group ZG1 includes a singlet and a quasi-doublet, the second zoom group ZG2 includes a singlet, an aperture stop and a doublet or quasi-doublet, and the third zoom group ZG3 includes a doublet or quasi-doublet and a singlet, from closest to furthest from the projection end of the projection zoom assembly.

The third optical group G3 includes, from closest to furthest from the projection end, a doublet or quasi-doublet spaced from a quasi-doublet that includes a concavo-convex meniscus and a bi-convex lens. Images are provided to the projection system from the image plane IM.

The first and second zoom groups ZG1 and ZG2 are movable in the example of FIGS. 3A-3C relative to the first and second groups G1 and G2 and relative to the third zoom group ZG3 which is fixed in this example. The first and second zoom groups ZG1 and ZG2 are also movable relative to each other. Thus, a first spacing S1 is defined between the first group G1 and the first zoom group ZG1, a second spacing S2 is defined between the first and second zoom groups ZG1 and ZG2, and a third spacing S3 is defined between the second and third zoom groups ZG2 and ZG3. Each of the spacings S1, S2 and S3 is adjustable in the example of FIGS. 3A-3C.

In the example of FIGS. 3A, 3B and 3C, the spacing S1 is larger in FIG. 3A than in either of FIG. 3B or 3C, and the spacing S1 is larger in FIG. 3B than in FIG. 3C. The first movable zoom group ZG1 is positioned closer to the first optical group G1 in FIG. 3C than in either of FIG. 3A OR 3B, and the first movable zoom group ZG1 is positioned closer to the first optical group G1 in FIG. 3B than in FIG. 3A.

Also, the spacing S2 is larger in FIG. 3A than in either of FIG. 3B or 3C, and the spacing S2 is larger in FIG. 3B than in FIG. 3C. The second movable zoom group ZG2 is positioned closer to the first movable zoom group ZG1 in FIG. 3C than in either of FIG. 3A or 3B, and the second movable zoom group ZG2 is positioned closer to the first movable zoom group ZG1 in FIG. 3B than in FIG. 3A.

Also, the spacing S3 is larger in FIG. 3C than in either of FIG. 3A or 3B, and the spacing S3 is larger in FIG. 3B than in FIG. 3A. The second movable zoom group ZG2 is positioned closer to the third zoom group ZG3 in FIG. 3A than in either of FIG. 3B OR 3C, and the second movable zoom group ZG2 is positioned closer to the third zoom group ZG3 in FIG. 3B than in FIG. 3C.

FIGS. 3A-3C demonstrate that the first movable zoom group in this example embodiment is independently movable relative to the lens groups G1, ZG2, ZG3 and G3. FIGS. 3A-3C also demonstrate that the second movable zoom group in this example embodiment is independently movable relative to the lens groups G1, ZG1, ZG3 and G3. While in certain embodiments, the lens groups G1, ZG3 and G3 may be fixed, one or more of the lens groups G1, ZG3 or G3 may be movable and/or one or more subsets of any of the lens groups G1, ZG1, ZG2, ZG3 or G3 may be movable translationally and/or rotationally. In addition, one or more lenses may be replaceable with one or more respective replacement lenses having one or more different optical properties.

Zoom Mechanism

Drive Mechanism

The projection lens zoom operation may be achieved via rotation of the zoom ring.

Rotation Direction

The rotation angle of the projection lens to achieve the entire zoom range may be 90°. The rotation direction from short focal length to long focal length may be clockwise when viewed from the projector side.

Rotational Movement

The rotational movement of the projection lens may be smooth in operation without rattles, squeaks, or binding.

Rotational Torque

The rotational torque of the projection lens zoom function in certain embodiments may be less than ≤0.5N-m.

Zoom Range Scale

In certain embodiments, there are no markings on the zoom ring of the projection lens.

Zoom Gear Ring

The projection lens zoom may include a gear ring in certain embodiments.

Focus Mechanism

Focusing System

The projection lens may have a front group focus via a focus helix.

Operating Focusing Range

The projection lens may have the ability to focus from infinity (collimated) down to 25 feet (7.6 meters).

Rotational Direction

The focus rotation angle of the projection lens assembly may be 180° over the operating range. Rotation direction for infinity to NEAR may be clockwise when viewed from the projector side.

Rotational Movement

The rotational movement of the projection lens may be smooth in operation without rattles, squeaks, or binding.

Rotational Torque

The rotational torque of the projection lens zoom function may in certain embodiments be less than ≤0.5N-m.

Focus Gear Ring

The projection lens focus may include a gear ring.

Projection Lens Assembly Weight

The weight of the projection lens assembly without motors, bracket, or mounting flange may be less than 7 lbs in certain embodiments.

Reliability

Shock

A projection lens assembly in accordance with certain embodiments may be configured such that it does not suffer from degradation in performance after exposure to a shock of 70G (980 m/s) of half sine wave impact when the lens is contained in the minimum unit packaging condition. The impacts maybe applied in six directions one at a time (six impacts total).

Vibration

The projection lens assembly in accordance with certain embodiments may be configured such that it does not suffer degradation in performance after exposure to sine wave vibration of frequencies ranging from 20 Hz to 60 Hz in steps of 4 Hz. The vibration may be applied for 2 minutes at each frequency with amplitude of 1 mm and applied on the three orthogonal axes with a maximum duration of 20 minutes in one direction.

Low Temperature Storage

A projection lens assembly in accordance with certain embodiments may be configured such that it does not suffer degradation in performance after being stored at −40° C. for a period of 24 hours.

High Temperature Storage

A projection lens assembly in accordance with certain embodiments may be configured such that it does not suffer degradation in performance after being stored at +70° C. for a period of 24 hours.

High Temperature and High Humidity Storage

A projection lens assembly in accordance with certain embodiments may be configured such that it does not suffer degradation in performance after being left under ambient temperature for 8 hours subsequent to storage at +50° C. and with 90% humidity for 240 hours.

Operating Temperature

A projection lens assembly in accordance with certain embodiments is configured to be capable of normal performance over an operating temperature range of 20° C. to 35° C.

Cemented Optical Interfaces

In certain embodiments, there are no cemented interfaces allowed in the projection lens.

Operating Humidity

Over the operating temperature range, the projection lens assembly may be capable of normal performance over an operating humidity range of 20% to 60%.

Cosmetic Quality

The outer lens barrel may be considered a non-decorative or "Class B" and inspected per the definition and criteria below.

The projection lens outer metal may be inspected at a distance of 457 mm (18") and each section viewed for a maximum of four seconds. The lighting condition may be in accordance with CIE Standard Illuminant A with approximately 80-120 foot candles illuminating the part. The light source may be diffuse in certain embodiments. The projection lens assembly may be configured to be unpacked, handled, inspected and repacked using suitable gloves that will not stain the finish of the lens due to any finger oils present. The projection lens assembly may be configured such that it ought not be placed on a hard surface or be allowed to sit in an open area for more than 30 minutes before inspection. Lenses may be configured such that they ought not be stacked next to each other unless suitable separation and protection such as plastic separators are in place.

TABLE 6

Example Optical Prescription
WFOV DLP Zoom (25 mm, f/2.5, 45 mm)

|  | RDY | THI | RMD | GLA | CCY | THC | GLC |
|---|---|---|---|---|---|---|---|
| >OBJ: | INFINITY | 12192.000000 |  |  | 100 | 100 |  |
| 1: | 110.00000 | 12.875000 |  | SLAL18_OHARA | 100 | 100 |  |
|  | SLB: "G1" |  |  |  |  |  |  |
| 2: | 288.50000 | 0.252000 |  |  | 100 | 100 |  |
| 3: | 104.25000 | 2.800000 |  | SNPH1_OHARA | 100 | 100 |  |
| 4: | 37.67500 | 15.356000 |  |  | 100 | 100 |  |

TABLE 6-continued

Example Optical Prescription
WFOV DLP Zoom (25 mm, f/2.5, 45 mm)

| | RDY | THI | RMD | GLA | CCY | THC | GLC |
|---|---|---|---|---|---|---|---|
| 5: | 122.62000 | 2.800000 | | SPHM52_OHARA | 100 | 100 | |
| 6: | 43.47500 | 11.522000 | | | 100 | 100 | |
| 7: | −1160.00000 | 2.800000 | | SPHM52_OHARA | 100 | 100 | |
| 8: | 65.70000 | 12.196000 | | | 100 | 100 | |
| 9: | INFINITY | 21.101220 | | | 100 | 100 | |
| SLB: "ZCT1" | | | | | | | |
| 10: | 250.00000 | 7.500000 | | SNBH53_OHARA | 100 | 100 | |
| SLB: "ZG1" | | | | | | | |
| 11: | −134.35000 | 27.261000 | | | 100 | 100 | |
| 12: | 242.00000 | 2.800000 | | SFPL51_OHARA | 100 | 100 | |
| 13: | 47.35000 | 4.890000 | | | 100 | 100 | |
| 14: | 141.60000 | 5.000000 | | SNPH1_OHARA | 100 | 100 | |
| 15: | −2000.00000 | 17.305000 | | | 100 | 100 | |
| 16: | INFINITY | 14.574566 | | | 100 | 100 | |
| SLB: "ZCT2" | | | | | | | |
| 17: | 86.50000 | 9.180000 | | SFPL51_OHARA | 100 | 100 | |
| SLB: "ZG2" | | | | | | | |
| 18: | −73.10000 | 4.150000 | | | 100 | 100 | |
| STO: | INFINITY | 4.923000 | | | 100 | 100 | |
| 20: | 2000.00000 | 2.500000 | | SNBH5_OHARA | 100 | 100 | |
| 21: | 50.00000 | 1.409000 | | | 100 | 100 | |
| 22: | 56.20000 | 10.000000 | | SFPL51_OHARA | 100 | 100 | |
| 23: | −81.82000 | 2.677000 | | | 100 | 100 | |
| 24: | INFINITY | 8.007804 | | | 100 | 100 | |
| SLB: "ZCT3" | | | | | | | |
| 25: | −45.70000 | 2.800000 | | SNBH52_OHARA | 100 | 100 | |
| SLB: "ZG3" | | | | | | | |
| 26: | 480.00000 | 0.491000 | | | 100 | 100 | |
| 27: | 298.00000 | 8.927000 | | SFPL51_OHARA | 100 | 100 | |
| 28: | −56.84000 | 2.998000 | | | 100 | 100 | |
| 29: | INFINITY | 2.258540 | | | 100 | 100 | |
| SLB: "ZCT4" | | | | | | | |
| 30: | 69.00000 | 9.675000 | | SFPL51_OHARA | 100 | 100 | |
| SLB: "G2" | | | | | | | |
| 31: | −196.25000 | 0.448000 | | | 100 | 100 | |
| 32: | 50.00000 | 12.040000 | | SFPL51_OHARA | 100 | 100 | |
| 33: | −116.00000 | 0.250000 | | | 100 | 100 | |
| 34: | −152.00000 | 2.800000 | | SNBH52_OHARA | 100 | 100 | |
| 35: | 40.50000 | 30.210000 | | | 100 | 100 | |
| 36: | −29.45000 | 2.800000 | | SLAH66_OHARA | 100 | 100 | |
| 37: | −43.65000 | 0.253000 | | | 100 | 100 | |
| 38: | 79.37000 | 8.920000 | | SLAL18_OHARA | 100 | 100 | |
| 39: | −140.25000 | 7.506000 | | | 100 | 100 | |
| SLB: "LAST" | | | | | | | |
| IMG: | INFINITY | 0.000000 | | | 100 | 100 | |

TABLE 7

Example Specification Data

| FNO | 2.50000 | | | |
|---|---|---|---|---|
| DIM | MM | | | |
| WL | 620.00 | 546.00 | 460.00 | |
| REF | 2 | | | |
| WTW | 1 | 2 | 1 | |
| XIM | 0.00000 | 0.00000 | 0.00000 | 0.00000 |
| YIM | 0.00000 | 11.31000 | 16.96500 | 22.62000 |
| WTF | 1.00000 | 1.00000 | 1.00000 | 1.00000 |
| VUX | 0.00000 | −0.06249 | −0.13627 | −0.23749 |
| VLX | 0.00000 | −0.06249 | −0.13627 | −0.23749 |
| VUY | 0.00000 | −0.21599 | −0.53249 | −1.11952 |
| VLY | 0.00000 | −0.19973 | −0.50037 | −0.50009 |
| POL | N | | | |

TABLE 8

Example Aperture Data/Edge Definitions

| CA | | |
|---|---|---|
| CIR S1 | | 55.000000 |
| CIR S2 | | 52.750000 |
| CIR S3 | | 43.750000 |
| CIR S4 | | 32.500000 |
| CIR S5 | | 32.000000 |
| CIR S6 | | 28.000000 |
| CIR S7 | | 28.000000 |
| CIR S8 | | 27.000000 |
| CIR S10 | | 27.850000 |
| CIR S11 | | 27.850000 |
| CIR S12 | | 23.500000 |
| CIR S13 | | 22.500000 |
| CIR S14 | | 22.500000 |
| CIR S15 | | 22.500000 |
| CIR S17 | | 22.000000 |
| CIR S18 | | 22.000000 |
| CIR S20 | | 20.400000 |
| CIR S21 | | 20.400000 |
| CIR S22 | | 20.600000 |
| CIR S23 | | 20.600000 |
| CIR S25 | | 21.000000 |

TABLE 8-continued

Example Aperture Data/Edge Definitions

| | |
|---|---|
| CIR S26 | 22.500000 |
| CIR S27 | 23.325000 |
| CIR S28 | 23.325000 |
| CIR S30 | 26.000000 |
| CIR S31 | 26.000000 |
| CIR S32 | 24.625000 |
| CIR S33 | 24.625000 |
| CIR S34 | 23.325000 |
| CIR S35 | 20.800000 |
| CIR S36 | 20.800000 |
| CIR S37 | 23.325000 |
| CIR S38 | 24.500000 |
| CIR S39 | 24.500000 |
| CIR S40 | 22.620135 |
| CIR S1 EDG | 56.000000 |
| CIR S2 EDG | 56.000000 |
| CIR S3 EDG | 45.000000 |
| CIR S4 EDG | 45.000000 |
| CIR S5 EDG | 33.500000 |
| CIR S6 EDG | 33.500000 |
| CIR S7 EDG | 29.000000 |
| CIR S8 EDG | 29.000000 |
| CIR S10 EDG | 29.000000 |
| CIR S11 EDG | 29.000000 |
| CIR S12 EDG | 25.000000 |
| CIR S13 EDG | 25.000000 |
| CIR S14 EDG | 23.500000 |
| CIR S15 EDG | 23.500000 |
| CIR S17 EDG | 23.500000 |
| CIR S18 EDG | 23.500000 |
| CIR S20 EDG | 22.500000 |
| CIR S21 EDG | 22.500000 |
| CIR S22 EDG | 22.500000 |
| CIR S23 EDG | 22.500000 |
| CIR S25 EDG | 23.000000 |
| CIR S26 EDG | 23.000000 |
| CIR S27 EDG | 24.500000 |
| CIR S28 EDG | 24.500000 |
| CIR S30 EDG | 27.250000 |
| CIR S31 EDG | 27.250000 |
| CIR S32 EDG | 26.000000 |
| CIR S33 EDG | 26.000000 |
| CIR S34 EDG | 24.500000 |
| CIR S35 EDG | 24.500000 |
| CIR S36 EDG | 24.500000 |
| CIR S37 EDG | 24.500000 |
| CIR S38 EDG | 26.000000 |
| CIR S39 EDG | 26.000000 |

TABLE 9

Refractive Indices

| GLASS CODE | 620.00 | 546.00 | 460.00 |
|---|---|---|---|
| SNPH1_OHARA | 1.802867 | 1.816450 | 1.843877 |
| SFPL51_OHARA | 1.496049 | 1.498457 | 1.502796 |
| SLAL18_OHARA | 1.727086 | 1.732342 | 1.741895 |
| SNBH52_OHARA | 1.670317 | 1.677193 | 1.690210 |
| SNBH53_OHARA | 1.734552 | 1.743423 | 1.760519 |
| SPHM52_OHARA | 1.616486 | 1.620332 | 1.627325 |
| SLAH66_OHARA | 1.770094 | 1.776215 | 1.787461 |
| SNBH5_OHARA | 1.651604 | 1.658034 | 1.670170 |

Example Zoom Data

TABLE 10

Example Zoom Positions

| POS | 1 | "WFOV DLP Zoom (25 mm, f/2.5, 45 mm)" |
|---|---|---|
| POS | 2 | "WFOV DLP Zoom (27 mm, f/2.5, 45 mm)" |
| POS | 3 | "WFOV DLP Zoom (29 mm, f/2.5, 45 mm)" |
| POS | 4 | "WFOV DLP Zoom (31 mm, f/2.5, 45 mm)" |
| POS | 5 | "WFOV DLP Zoom (32 mm, f/2.5, 45 mm)" |

TABLE 11

Example Zoom Characteristics

| | POS 1 | POS 2 | POS 3 | POS 4 | POS 5 |
|---|---|---|---|---|---|
| VUY F1 | 0.2033E−10 | 0.1793E−10 | 0.4902E−10 | 0.7944E−10 | 0.2927E−11 |
| VLY F1 | 0.2033E−10 | 0.1793E−10 | 0.4902E−10 | 0.7944E−10 | 0.2927E−11 |
| VUY F2 | −0.21599 | −0.18183 | −0.15478 | −0.13299 | −0.12364 |
| VLY F2 | −0.19973 | −0.16979 | −0.14649 | −0.12288 | −0.09459 |
| VUY F3 | −0.53249 | −0.44066 | −0.37057 | −0.30906 | −0.25788 |
| VLY F3 | −0.50037 | −0.41763 | −0.35503 | −0.27383 | −0.23159 |
| VUY F4 | −1.11952 | −0.89543 | −0.68887 | −0.48267 | −0.39913 |
| VLY F4 | −0.50009 | −0.57741 | −0.57821 | −0.48305 | −0.44152 |
| VUX F1 | 0.1000E−09 | 0.1000E−09 | 0.1000E−09 | 0.1000E−09 | 0.1000E−09 |
| VLX F1 | 0.1000E−09 | 0.1000E−09 | 0.1000E−09 | 0.1000E−09 | 0.1000E−09 |
| VUX F2 | −0.06249 | −0.05367 | −0.04655 | −0.04071 | −0.03817 |
| VLX F2 | −0.06249 | −0.05367 | −0.04655 | −0.04071 | −0.03817 |
| VUX F3 | −0.13627 | −0.11720 | −0.10182 | −0.08919 | −0.08371 |
| VLX F3 | −0.13627 | −0.11720 | −0.10182 | −0.08919 | −0.08371 |
| VUX F4 | −0.23749 | −0.20350 | −0.17650 | −0.15454 | −0.14505 |
| VLX F4 | −0.23749 | −0.20350 | −0.17650 | −0.15454 | −0.14505 |
| THI S9 | 21.10122 | 16.39599 | 12.20234 | 8.40022 | 6.62570 |
| THC S9 | 100 | 100 | 100 | 100 | 100 |
| THI S16 | 14.57457 | 12.65307 | 10.97057 | 9.54864 | 8.92002 |
| THC S16 | 100 | 100 | 100 | 100 | 100 |
| THI S24 | 8.00780 | 11.98483 | 16.45705 | 21.53377 | 24.29253 |
| THC S24 | 100 | 100 | 100 | 100 | 100 |
| THI S29 | 2.25854 | 4.90771 | 6.31204 | 6.45941 | 6.10364 |
| THC S29 | 100 | 100 | 100 | 100 | 100 |

TABLE 12

Example Imaging Characteristics

|  | POS 1 | POS 2 | POS 3 | POS 4 | POS 5 |
|---|---|---|---|---|---|
| INFINITE CONJUGATES | | | | | |
| EFL | 25.0001 | 27.0002 | 29.0002 | 31.0002 | 32.0002 |
| BFL | 7.4611 | 7.4537 | 7.4781 | 7.4773 | 7.4677 |
| FFL | 54.7107 | 54.7102 | 54.7355 | 54.7753 | 54.7962 |
| FNO | 2.4995 | 2.4996 | 2.4996 | 2.4997 | 2.4997 |
| AT USED CONJUGATES | | | | | |
| RED | 0.0020 | 0.0022 | 0.0024 | 0.0025 | 0.0026 |
| FNO | 2.5000 | 2.5000 | 2.5000 | 2.5000 | 2.5000 |
| OBJ DIS | 12192.0000 | 12192.0000 | 12192.0000 | 12192.0000 | 12192.0000 |
| TT | 12488.2561 | 12488.2556 | 12488.2560 | 12488.2560 | 12488.2559 |
| IMG DIS | 7.5060 | 7.5060 | 7.5060 | 7.5060 | 7.5060 |
| OAL | 288.7501 | 288.7496 | 288.7500 | 288.7500 | 288.7499 |
| PARAXIAL IMAGE | | | | | |
| HT | 22.6200 | 22.6200 | 22.6200 | 22.6200 | 22.6200 |
| THI | 7.5122 | 7.5132 | 7.5468 | 7.5557 | 7.5513 |
| ANG | 42.1093 | 39.9320 | 37.9351 | 36.1017 | 35.2412 |
| ENTRANCE PUPIL | | | | | |
| DIA | 10.0019 | 10.8019 | 11.6018 | 12.4017 | 12.8016 |
| THI | 56.9515 | 56.7396 | 56.5398 | 56.3554 | 56.2685 |
| EXIT PUPIL | | | | | |
| DIA | 111.5916 | 143.7111 | 186.4766 | 243.3103 | 278.2495 |
| THI | −271.4669 | −351.7645 | −458.6446 | −600.7199 | −688.0723 |
| STO DIA | 34.4136 | 36.3523 | 38.2632 | 40.1667 | 41.1191 |

Incorporation by Reference

What follows is a cite list of references which are, in addition to those references cited above and below herein, and including that which is described as background, the invention summary, brief description of the drawings, the drawings and the abstract, hereby incorporated by reference into the detailed description of the preferred embodiments below, as disclosing alternative embodiments of elements or features of the preferred embodiments not otherwise set forth in detail below. A single one or a combination of two or more of these references may be consulted to obtain a variation of the preferred embodiments described in the detailed description below. Further patent, patent application and non-patent references are cited in the written description and are also incorporated by reference into the preferred embodiment with the same effect as just described with respect to the following references:

U.S. Pat. Nos. 5,973,826, 6,033,079, 6,072,852, 6,147,818, 6,183,095, 6,188,513, 6,226,346, 6,262,836, 6,318,869, 6,426,506, 6,636,350, 6,864,861, 6,906,866, 6,927,901, 6,985,210, 7,009,140, 7,061,959, 7,085,075, 7,151,592, 7,190,527, 7,190,530, 7,199,922, 7,218,445, 7,237,915, 7,355,678, 7,375,798, 7,382,540, 7,450,301, 7,508,581, 7,859,748, 7,884,303, 8,362,391, and RE42,118.

The following documents are also incorporated by reference:

ANSI/NAPM IT7.228-1997 American National Standard for Audio Visual Systems, Electronic Projection-Fixed Resolution Projectors FPDM, Jun. 1, 2001 VESA Flat Panel Display Measurements Standard, V2.0

Mil-Std-810F Test Method for Environmental Engineering Considerations and Laboratory Tests MIL-PRF-13830B Optical Components for Fire Control Instruments MIL-C-675 Reflection-Reducing Films for Glass Optical Elements While an exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention.

In addition, in methods that may be performed according to preferred embodiments herein and that may have been described above, the operations have been described in selected typographical sequences. However, the sequences have been selected and so ordered for typographical convenience and are not intended to imply any particular order for performing the operations, except for those where a particular order may be expressly set forth or where those of ordinary skill in the art may deem a particular order to be necessary.

A group of items linked with the conjunction "and" in the above specification should not be read as requiring that each and every one of those items be present in the grouping in accordance with all embodiments of that grouping, as various embodiments will have one or more of those elements replaced with one or more others. Furthermore, although items, elements or components of the invention may be described or claimed in the singular, the plural is contemplated to be within the scope thereof unless limitation to the singular is explicitly stated or clearly understood as necessary by those of ordinary skill in the art.

The presence of broadening words and phrases such as "one or more," "at least," "but not limited to" or other such as phrases in some instances shall not be read to mean that the narrower case is intended or required in instances where such broadening phrases may be absent. The use of the term "assembly" does not imply that the components or functionality described or claimed as part of the assembly are all configured in a common package. Indeed, any or all of the various components of a assembly, e.g., optical group 1 and optical group 2, may be combined in a single package or separately maintained and may further be manufactured, assembled or distributed at or through multiple locations.

Different materials may be used to form the lenses of the optical assemblies of the several embodiments. For example, various kinds of glass and/or transparent plastic or polymeric materials may be used.

What is claimed is:

1. A projection zoom lens assembly for a digital cinema projection system, comprising:
    a first optical group including one or more wide angle lenses for projecting digital cinema images;
    a second optical group including a set of zoom optical groups each comprising two or more lenses, including:
    a first independently movable zoom group that comprises a first bi-convex lens singlet spaced from a quasi-doublet that comprises a quasi-plano-concave lens and a convexo-quasi-plano lens;
    a second independently movable zoom group that comprises a second bi-convex lens singlet spaced from a doublet that comprises a plano-concave or quasi-plano-concave lens and a bi-convex lens; and
    a third zoom group; and
    a third optical group including multiple lenses for receiving images for projection.

2. The projection zoom lens assembly of claim 1, wherein the first movable zoom group is movable relative to each of the first and third optical groups and the third zoom group.

3. The projection zoom lens assembly of claim 2, wherein the second movable zoom group is movable relative to the first movable zoom group, the first and third optical groups, and the third zoom group.

4. The projection zoom lens assembly of claim 1, wherein the first optical group comprises a first lens having a largest diameter among zoom lenses.

5. The projection zoom lens assembly of claim 4, wherein the first optical group comprises a second lens having a second largest diameter.

6. The projection zoom lens assembly of claim 5, wherein each of the lenses of the second and third optical groups have approximately a same diameter which is smaller than the diameters of the first and second lenses of the first optical group.

7. The projection zoom lens assembly of claim 1, wherein the second movable zoom group comprises an aperture stop.

8. The projection zoom lens assembly of claim 7, wherein the aperture stop is disposed between said second singlet and said second doublet of the second movable zoom group.

9. The projection zoom lens assembly of claim 1, wherein the third optical group comprises a doublet or a quasi-doublet or both.

10. The projection zoom lens assembly of claim 9, wherein the third optical group includes a meniscus and a biconvex lens.

11. The projection zoom lens assembly of claim 1, wherein the third zoom group comprises a doublet spaced from a bi-convex or convexo-quasi-planar lens singlet, wherein the doublet of the third zoom group comprises a concavo-planar lens and a plano-convex lens.

12. The projection zoom lens assembly of claim 1, wherein a first adjustable spacing is defined between the first optical group and the first movable zoom group, a second adjustable spacing is defined between the first movable zoom group and the second movable zoom group, and a third adjustable spacing is defined between the second movable zoom group and the third zoom group.

13. The projection zoom lens assembly of claim 1, comprising axial chromatic aberrations less than 20 microns.

14. The projection zoom lens assembly of claim 1, comprising lateral chromatic aberrations less than 0.75 pixels.

15. The projection zoom lens assembly of claim 1, comprising lateral chromatic aberrations less than 0.5 pixels.

16. The projection zoom lens assembly of claim 1, comprising distortion at 0.75 field of less than 2.5%.

17. The projection zoom lens assembly of claim 1, comprising distortion at 0.95 field of less than 2.0%.

18. The projection zoom lens assembly of claim 1, comprising a throw ratio range between 0.8-1.1.

19. The projection zoom lens assembly of claim 1, comprising a color transmission differential of less than 8%.

20. The projection zoom lens assembly of claim 1, comprising a total light transmission of greater than 90%.

21. The projection zoom lens assembly of claim 1, comprising a focus drift of less than 5 microns/20° C.

22. The projection zoom lens assembly of claim 1, wherein the lens assembly is configured to focus from infinity to 25 feet.

23. The projection zoom lens assembly of claim 1, wherein said third zoom group comprises a fixed zoom group.

24. A digital cinema projection system, comprising:
    a relay lens assembly, and
    a projection zoom lens assembly as recited in claim 1.

25. The digital cinema projection system of claim 24, wherein the first movable zoom group is movable relative to each of the first and third optical groups and the third zoom group.

26. The digital cinema projection system of claim 25, wherein the second movable zoom group is movable relative to the first movable zoom group, the first and third optical groups, and the third zoom group.

27. The digital cinema projection system of claim 24, wherein the first optical group comprises a first lens having a largest diameter among zoom lenses.

28. The digital cinema projection system of claim 27, wherein the first optical group comprises a second lens having a second largest diameter.

29. The digital cinema projection system of claim 28, wherein each of the lenses of the second and third optical groups have approximately a same diameter which is smaller than the diameters of the first and second lenses of the first optical group.

30. The digital cinema projection system of claim 24, wherein the second movable zoom group comprises an aperture stop.

31. The digital cinema projection system of claim 30, wherein the aperture stop is disposed between a doublet and a singlet of the second movable zoom group.

32. The digital cinema projection system of claim 24, wherein the third optical group comprises a doublet or a quasi-doublet or both.

33. The digital cinema projection system of claim 32, wherein the third optical group includes a meniscus and a biconvex lens.

34. The digital cinema projection system of claim 24, wherein the third zoom group comprises a doublet spaced from a bi-convex or convexo-quasi-planar lens singlet, wherein the doublet of the third zoom group comprises a concavo-planar lens and a plano-convex lens.

35. The digital cinema projection system of claim 24, wherein a first adjustable spacing is defined between the first optical group and the first movable zoom group, a second adjustable spacing is defined between the first movable zoom group and the second movable zoom group, and a third adjustable spacing is defined between the second movable zoom group and the third zoom group.

36. The digital cinema projection system of claim 24, comprising axial chromatic aberrations less than 20 microns.

37. The digital cinema projection system of claim 24, comprising lateral chromatic aberrations less than 0.75 pixels.

38. The digital cinema projection system of claim 24, comprising lateral chromatic aberrations less than 0.5 pixels.

39. The digital cinema projection system of claim 24, comprising distortion at 0.75 field of less than 2.5%.

40. The digital cinema projection system of claim 24, comprising distortion at 0.95 field of less than 2.0%.

41. The digital cinema projection system of claim 24, comprising a throw ratio range between 0.8-1.1.

42. The digital cinema projection system of claim 24, comprising a color transmission differential of less than 8%.

43. The digital cinema projection system of claim 24, comprising a total light transmission of greater than 90%.

44. The digital cinema projection system of claim 24, comprising a focus drift of less than 5 microns/20° C.

45. The digital cinema projection system of claim 24, wherein the lens assembly is configured to focus from infinity to 25 feet.

46. The digital cinema projection system of claim 24, wherein the lens assembly is configured such that a rotational torque of the projection zoom lens is less than 0.5 N-m.

47. The digital cinema projection system of claim 24, wherein said third zoom group comprises a fixed zoom group.

* * * * *